United States Patent
Trojanowski et al.

(10) Patent No.: US 10,719,466 B2
(45) Date of Patent: Jul. 21, 2020

(54) SYSTEM AND METHOD FOR IMPLEMENTING A MULTI-THREADED DEVICE DRIVER IN A COMPUTER SYSTEM

(71) Applicant: Rambus Inc., Sunnyvale, CA (US)

(72) Inventors: Bart Trojanowski, Ottawa (CA);
Michael L. Takefman, Nepean (CA);
Maher Amer, Nepean (CA)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 16/032,241

(22) Filed: Jul. 11, 2018

(65) Prior Publication Data
US 2019/0065420 A1    Feb. 28, 2019

Related U.S. Application Data

(63) Continuation of application No. 14/452,473, filed on Aug. 5, 2014, now abandoned.

(51) Int. Cl.
G06F 9/30     (2018.01)
G06F 13/362   (2006.01)
G06F 13/42    (2006.01)
G06F 13/366   (2006.01)
G06F 9/48     (2006.01)

(52) U.S. Cl.
CPC ........ *G06F 13/3625* (2013.01); *G06F 9/3009* (2013.01); *G06F 9/4881* (2013.01); *G06F 13/366* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 2004/0019891 A1* | 1/2004 | Koenen | ........ | G06F 9/5044 718/102 |
| 2004/0123007 A1* | 6/2004 | Stevens, Jr. | ........ | G06F 13/378 710/260 |
| 2005/0228936 A1* | 10/2005 | Kuo | ........ | G06F 13/28 711/1 |
| 2008/0250422 A1* | 10/2008 | Lewis | ........ | G06F 9/4881 718/107 |
| 2009/0217276 A1* | 8/2009 | Brenner | ........ | G06F 9/4856 718/102 |
| 2010/0318998 A1* | 12/2010 | Golla | ........ | G06F 9/5011 718/104 |
| 2015/0095918 A1* | 4/2015 | Alameldeen | ........ | G06F 12/0811 718/104 |

* cited by examiner

*Primary Examiner* — Shih-Wei Kraft
(74) *Attorney, Agent, or Firm* — Lowenstein Sandler LLP

(57) ABSTRACT

A polling device driver is partitioned into a plurality of driver threads for controlling a device of a computer system. The device has a first device state of an unscouted state and a scouted state, and a second device state of an inactive state and an active state. A driver thread of the plurality of driver threads determines that the first device state of the device state is in the unscouted state, and changes the first state of the device to the scouted state. The driver thread further determines that the second device state of the device is in the inactive state and changes the second device state of the device to the active state. The driver thread executes an operation on the device during a pre-determined time slot configured for the driver thread.

14 Claims, 5 Drawing Sheets

SYSTEM AND METHOD FOR IMPLEMENTING A MULTI-THREADED DEVICE DRIVER IN A COMPUTER SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED FIELD

The present disclosure relates in general to techniques for implementing a multi-threaded driver operating on a computer system under a variety of operating systems. The present disclosure further relates to a technique for implementing a multi-threaded device driver in a computer system.

BACKGROUND

A typical device driver in a computer system runs a single execution thread that is driven by device interrupts. While a single execution thread is simple to design and implement, there are intrinsic performance and latency issues, mainly, servicing and managing interrupt status is time consuming on a heavy loaded system. Furthermore, a non-realtime operating system cannot guarantee the latency incurred by servicing an interrupt.

A simple change to improve the latency issue is to change a device driver from an interrupt driven operation to a polling operation. However, a polling operation of a device driver increases the central processing unit (CPU) utilization, thus decreasing the efficiency of operations when the device is lightly loaded. The cost and delay of context switching on a non-real-time operating system still exists.

To decrease the overhead for a polling operation, a polling device driver may be split into multiple threads. The multiple thread operation can increase the efficiency of the device driver at the expense of latency. To reduce latency in a multi-core system, a driver thread may be pinned to a particular processor core. This increases the performance but decreases the latency at the cost of underutilizing the processor core. Even if the processor core is not underutilized, the CPU utilization may be unbalanced or the CPU may be overloaded because the processor core is dedicated to the driver.

Some operating systems have a limit on duration for a thread hold onto a processor core before the thread hold is involuntarily pre-empted or voluntarily released. For an operating system with a short execution limit or no real-time scheduling capability, the performance and latency issues become considerable. There is a continuing need in the art for an improved scheduling system that provides increased performance, decreased latency, and proper utilization/balance of the processor core.

SUMMARY

A method of implementing a multi-threaded device driver for a computer system is disclosed. According to one embodiment, a polling device driver is partitioned into a plurality of driver threads for controlling a device of a computer system. An individual device driver thread may support multiple devices concurrently. The device has a first device state of an unscouted state and a scouted state, and a second device state of an inactive state and an active state. A driver thread of the plurality of driver threads determines that the first device state of the device state is in the unscouted state, and changes the first state of the device to the scouted state. The driver thread further determines that the second device state of the device is in the inactive state and changes the second device state of the device to the active state. The driver thread executes an operation on the device during a pre-determined time slot configured for the driver thread. The driver thread relinquishes the device by returning the device to the unscouted/active state and finally the unscouted/inactive state.

The present partitioning technique can be scaled to control one or more instances of a device. The present partitioning technique is intended for a multi-core processor, however can be extended and scaled to a large number of execution cores. The present partitioning technique can be also extended and scaled to a multi-socket computer system where each socket is a multi-core processor.

According to an aspect of one embodiment, the number of threads can be less than, equal to, or greater than the number of devices. According to another aspect of one embodiment, the number of threads is less than or equal to the number of processor cores. According to still another aspect of one embodiment, the number of threads is less than or equal to the number of hyper-threads, where the number of hyper-threads per processor core is greater than one.

According to another embodiment, any individual driver thread avoids monopolizing a processor core/hyper-thread by handing off device processing actions (or "work") to another driver thread and relinquishes the processor core/hyper-thread.

According to still another embodiment, the execution quanta of a driver thread is configurable to adjust a minimum time that a thread will execute before attempting to transfer a device control to another thread, allowing optimization of the number of threads executing at one time.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate various embodiments and together with the general description given above and the detailed description of the various embodiments given below serve to explain and teach the principles described herein.

Figure 1:
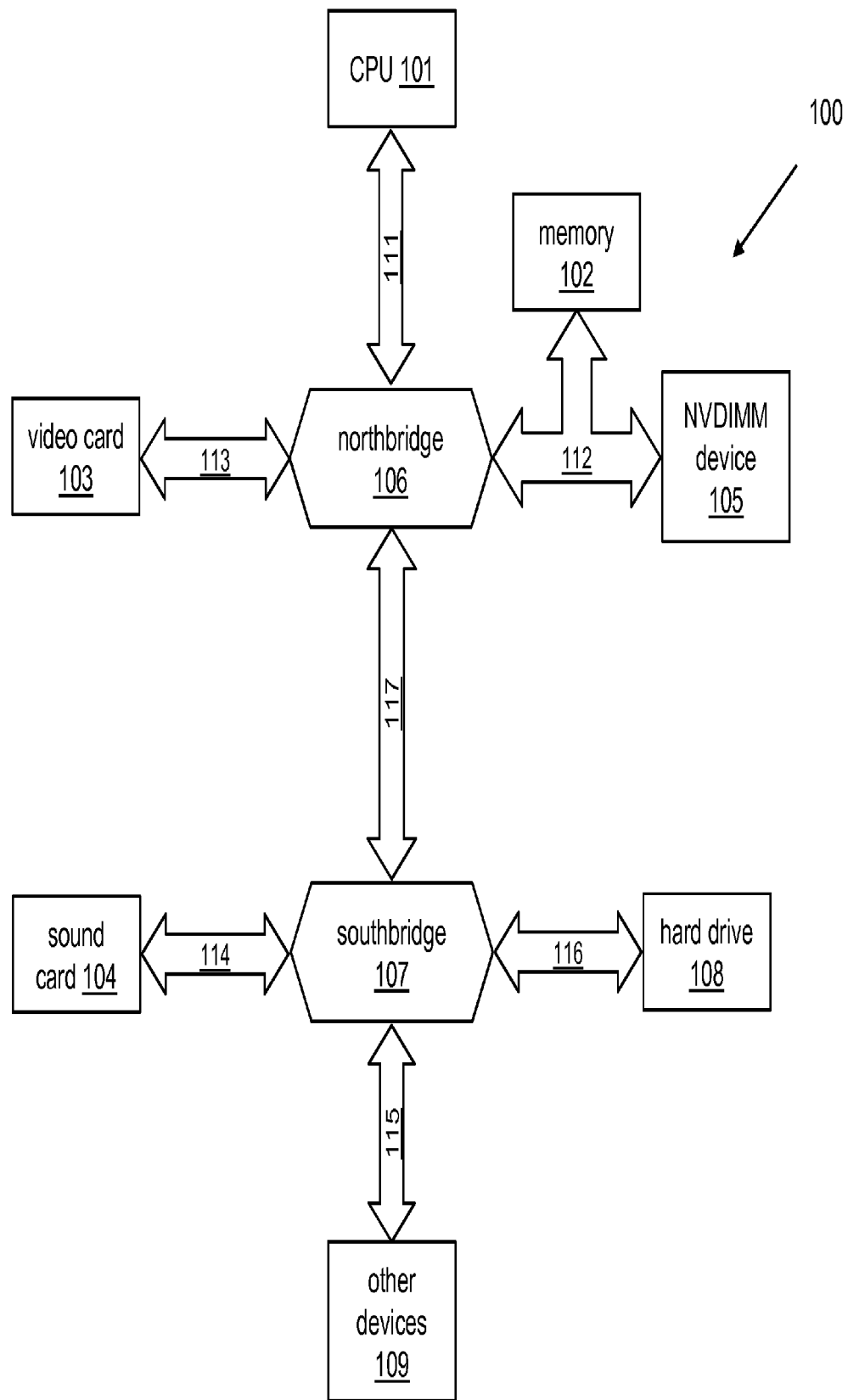
FIG. 1 illustrates a block diagram of an exemplary computer system according to one embodiment.

The figures are not necessarily drawn to scale and elements of similar structures or functions are generally represented by like reference numerals for illustrative purposes throughout the figures. The figures or text shows examples of possible implementations of the driver controlling a non-volatile dual in-line memory module (NVDIMM) or a co-processor input/output (CPIO) device, however the teachings are applicable to other implementations without deviating from the present disclosure. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method of implementing a multi-threaded co-operative device driver for a computer system. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A method of implementing a multi-threaded device driver for a computer system is disclosed. According to one embodiment, a polling device driver is partitioned into a plurality of driver threads for controlling a device of a computer system. The device has a first device state of an unscouted state and a scouted state, and a second device state of an inactive state and an active state. The first and second device states are independent and together form four unique device states, namely, unscouted/inactive, unscouted/active, scouted/inactive, and scouted/active states. A driver thread of the plurality of driver threads can operate on multiple devices simultaneously. For a given device, the driver thread determines that the first device state of the device state is in the unscouted state, and changes the first state of the device to the scouted state. The driver thread further determines that the second device state of the device is in the inactive state and changes the second device state of the device to the active state. The driver thread executes an operation (or multitude of operations) on the device during a pre-determined time slot configured for the driver thread. Once the pre-determined time slot expires, the driver thread changes the first device state of the device to the unscouted state. The driver thread then executes another operation for another pre-determined time slot. If the driver thread observes that the first state of the device has entered the scouted state, the driver thread completes the operation and changes the second device state to inactive. If, during this time slot, the device completes all operations without being scouted, the driver thread changes the second device state to inactive.

A multi-threaded device driver that is configured to run multiple driver threads has a performance advantage. The multi-threaded device driver avoids the performance loss and latency increase inherent in executing and ensures that a subset of processor cores does not have an execution overload.

The present disclosure describes a system and method for implementing a polling device driver on a computer system. The polling device driver is multi-threaded and provides improved performance in terms of latency and data throughput when running on an operating system without real-time (latency) guarantees. For example, a polling device driver may be configured to control an I/O device such as a co-processor input/output (CPIO) device. Moreover, it is understood that other devices in a computer system can be implemented with a multi-threaded polling device driver to exploit performance improvement without deviating from the scope of the present disclosure.

A real-time system guarantees on how long it takes to service an event using a hardware or software interrupt. Systems such as VMWARE, LINUX, and WINDOWS have a non-real-time scheduler that does not have a strict upper bound on handling events (e.g., an I/O request from an application). Because the non-real-time scheduler lacks a control of event priorities, a long stall in an I/O request may occur. The present polling device driver overcomes the shortcomings of a non-real-time scheduler by facilitating fast handling of events and holding onto a CPU as long as there is an I/O request pending. Furthermore, by having a plurality of threads in the system, it is guaranteed that the device operation can be executed on the first hyper-thread or a processor core that becomes available to the device driver.

It is noted that the terms, "polling device driver," "device driver," and "driver" are exchangeably used in the present disclosure. The term "operation" refers to any task that a driver performs or executes to operate on a device including, but not limited to, sending a command, polling and processing a status, and moving data to/from the device. The term "execution quanta" or "time quanta" refers to a time slot that a driver thread is allowed to execute before it should relinquish a processor core. The execution quanta are longer than a time a device takes to execute an operation.

FIG. 1 illustrates a block diagram of an exemplary computer system according to one embodiment. A computer system 100 includes a central processing unit (CPU) 101, a main memory unit (e.g., dynamic random access memory (DRAM)) 102, and CPIO devices including a video card 103, a sound card 104, a hard drive 108, and any generic CPIO device 105. These components are connected together via buses on a motherboard (not shown). The CPU 101, the main memory unit 102, and the video card 103 are connected to a northbridge 106 via a front-side bus (FSB) 111, a main memory bus 112, and a peripheral component interconnect express (PCIe) bus 113, respectively. The northbridge 106 generally refers to a chip in a chipset of the motherboard that connects a high-speed bus.

Slower buses, including the PCI bus 114, a universal serial bus (USB) 115, and a serial advanced technology attachment (SATA) bus 116 are usually connected to a southbridge 107. The southbridge 107 generally refers to another chip in the chipset that is connected to the northbridge 106 via a direct media interface (DMI) bus 117. The southbridge 107 manages the information traffic between CPIO devices that are connected via a low-speed bus. For example, the sound card 104 typically connects to the computer system 100 via the PCI bus 114. Storage drives, such as the hard drive 108, typically connect to the computer system 100 via the SATA bus 116. A variety of other devices 109, ranging from a keyboard to an mp3 music player, may connect to the system 100 via the USB 115.

Similar to the main memory unit 102 (e.g., DRAM), the generic CPIO device 105 connects to a memory controller in the northbridge 106 via the main memory bus 112. For example, the generic CPIO device 105 may be inserted into a dual in-line memory module (DIMM) memory slot. Because the main memory bus 112 generally supports higher bandwidths (e.g., compared to the SATA bus 116), the exemplary computer system of FIG. 1 connecting the generic CPIO device 105 to the main memory bus eliminates or alleviates I/O bottlenecks that would otherwise limit the I/O performance of the generic CPIO device 105.

Figure 2:
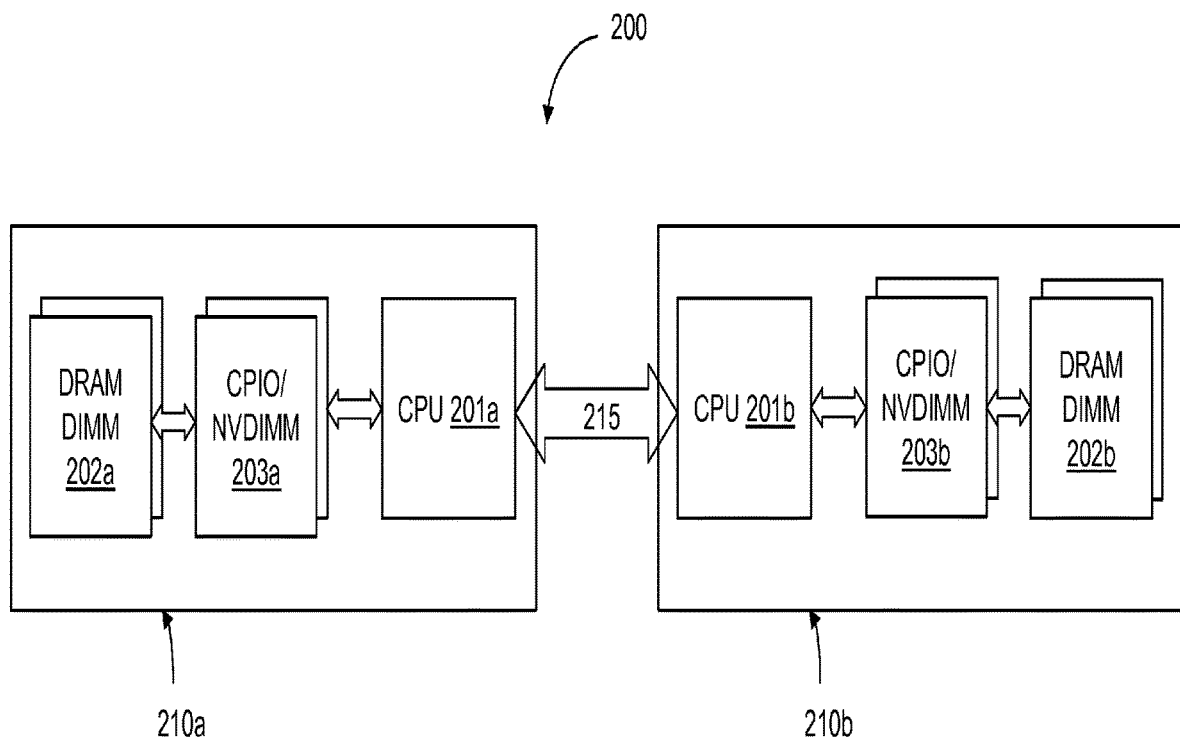
FIG. 2 illustrates a block diagram of an exemplary two-socket server system, according to one embodiment.

FIG. 2 illustrates a block diagram of an exemplary two-socket server system 200, according to one embodiment. Each socket server system, 210a or 210b, includes a CPU 201, a DRAM DIMM 202, and a CPIO/NVDIMM 203. The CPU 201a of a first socket server system 210a is interconnected to the CPU 201b of a second socket server system 210b through an inter-processor bus 215 (e.g., QPI or HyperTransport). The I/O system of the socket server systems is not shown, but it is apparent to one ordinarily skilled in the art as to how the I/O system is connected and accessed by the processors/software.

Figure 3:
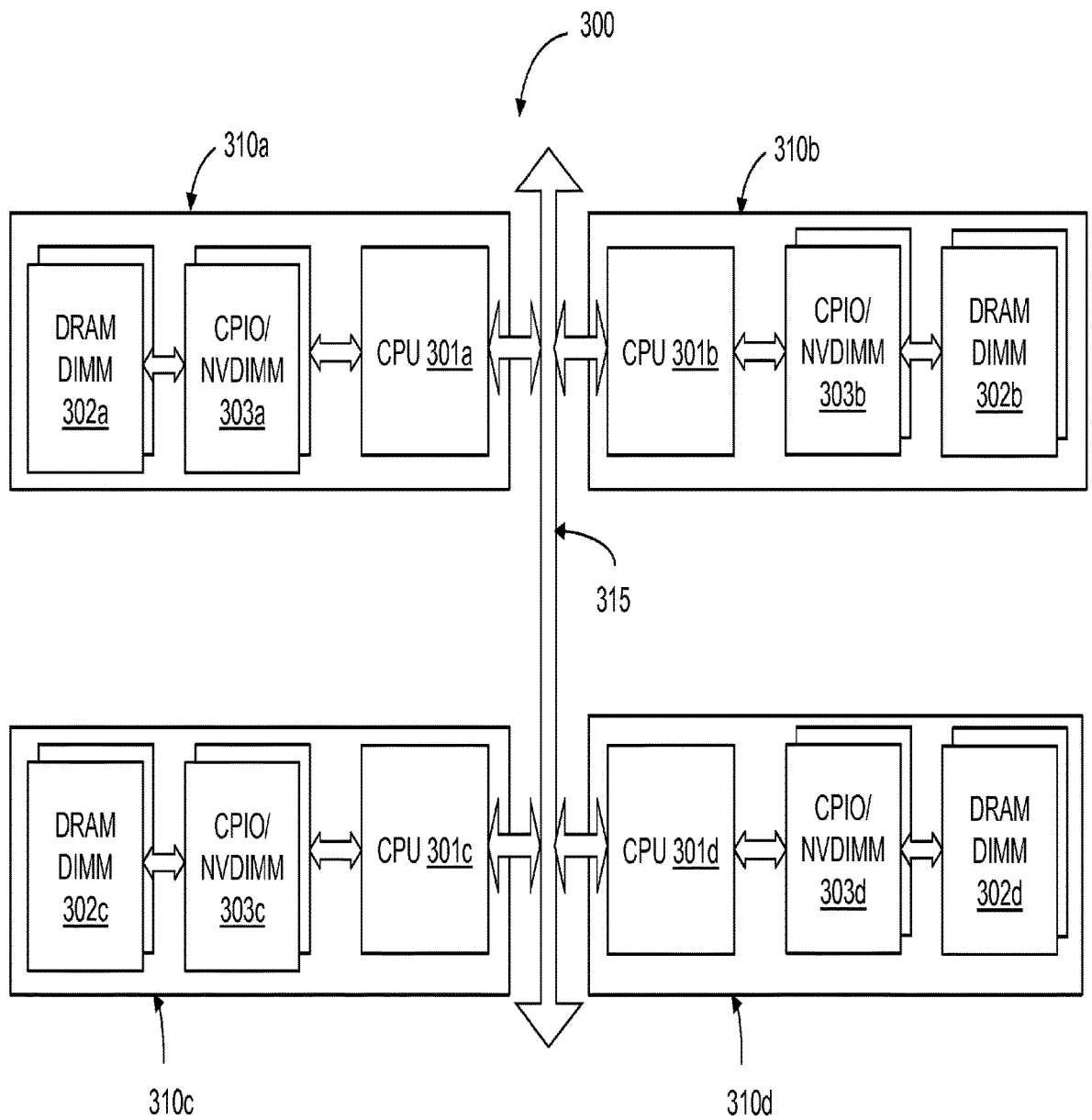
FIG. 3 illustrates a block diagram of an exemplary four-socket server system, according to one embodiment.

FIG. 3 illustrates a block diagram of an exemplary four-socket server system 300, according to one embodiment. Each socket server system, 310a, 310b, 310c, or 310d includes a CPU 301, a DRAM DIMM 302, and a CPIO/NVDIMM 303. The CPUs 301a, 301b, 301c, and 301d of each socket server system 310a, 310b, 310c, and 310d are interconnected through an inter-processor bus 315 (e.g., QPI or HyperTransport). The I/O system of the socket server systems is not shown, but it is apparent to one ordinarily skilled in the art as to how the I/O system is connected and accessed by the processors/software.

Figure 4:
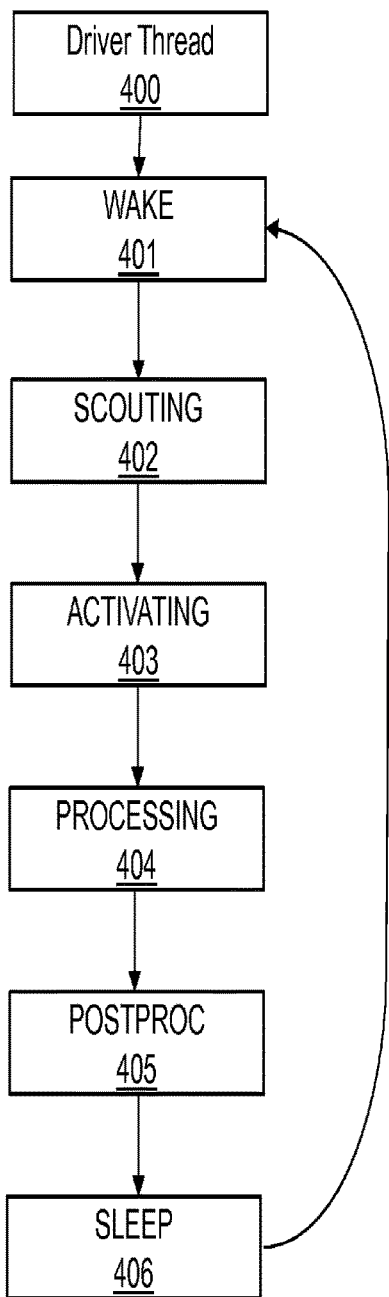
FIG. 4 illustrates an exemplary state transition diagram of a device driver thread and a corresponding device, according to one embodiment.
Figure 4:
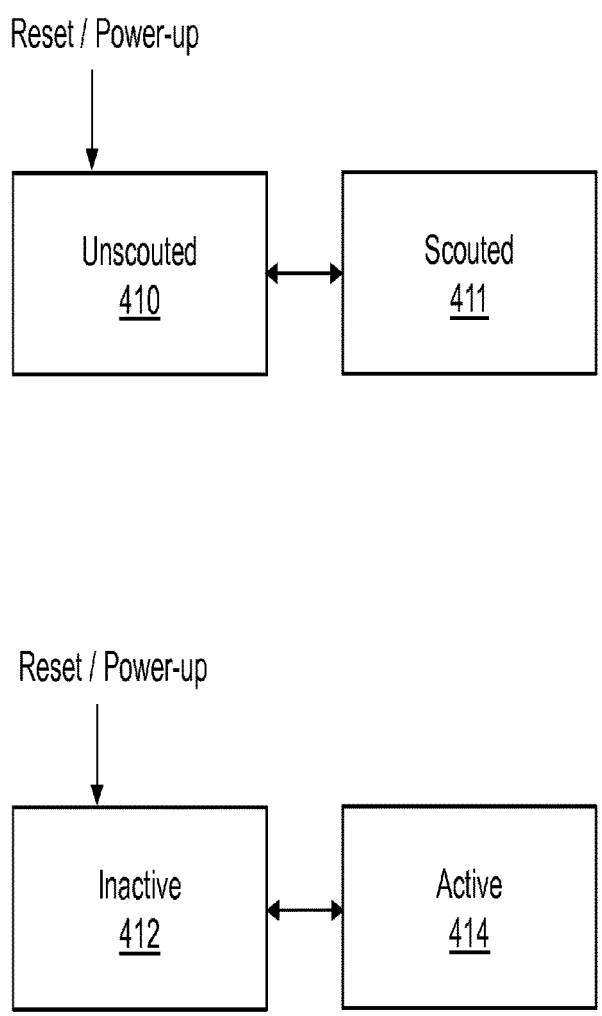

FIG. 4 illustrates an exemplary state transition diagram of a device driver thread and a corresponding device, according to one embodiment. A device driver thread 400 is created. The device driver enters in a wake state 401, and transition through scouting state 402, activating state 403, processing state 404, post-processing state 405 and sleep state 406. During the wake state 401, the device driver thread 400 searches for a device that requires a driver support and claims the ownership of the device by changing the state of the device from an unscouted state 410 to a scouted state 411. The device driver thread 400 then changes its own status to the scouting state 402. If another device driver thread holds the device in an active state, the device driver thread 400 waits until the other device driver thread completes its operation and updates the state of the device to an inactive state 412. When the device driver thread 400 observes that the device changes its state to an inactive state 412, the second driver thread enters the activating state 403 and changes the device state to an active state 414. During the activating state 403, the device driver thread 400 executes operations on the device for a time quanta configured for the device driver thread 400. When the time quanta has expired, the device driver thread 400 changes to the processing state 404 and marks the device state as the unscouted state 410.

A device has two independent state variables for a scout state and an active state. The scout state and the active state can each be in one of two states, i.e., unscouted state 410 or scouted state 411, and inactive state 412 or active state 414. By default, a device after it is reset or powered up, the device has an unscouted state 410 and inactive state 412.

Figure 5:
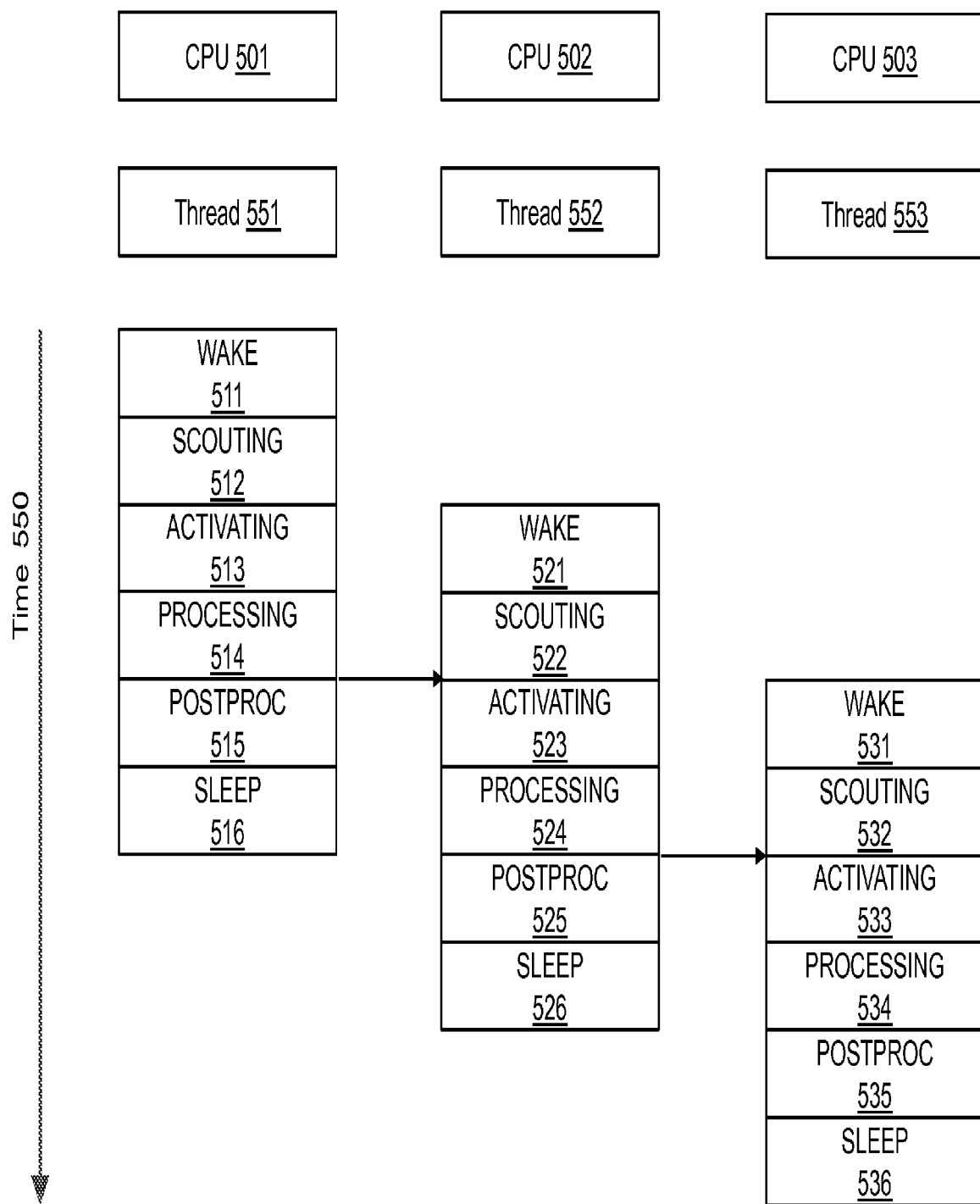
FIG. 5 illustrates state transitions of driver threads that operate on three CPU cores, according to one embodiment.

FIG. 5 illustrates state transitions of driver threads that operate on three CPU cores, according to one embodiment. The vertical axis 550 (not to scale) depicts time, and the horizontal axis shows migration of a device control from one driver thread associated with a first CPU core to another driver thread associated with a second CPU core. CPU core 501 executes a first thread that transitions through wake state 511, scouting state 512, activating state 513, processing 514, post-processing state 515 and sleep 516. CPU core 502 executes a second thread that transitions through states wake state 521, scouting state 522, activating state 523, processing 524, post-processing state 525 and sleep 526. CPU core 503 executes a third thread that transitions through states wake state 531, scouting state 532, activating state 533, processing 534, post-processing state 535 and sleep 536. Although FIG. 5 shows three CPU cores 501, 502, and 503, and three driver threads 551, 552, and 553, it is apparent to one of ordinary skill in the art that any number of CPU cores and driver threads may be used without deviating from the scope of the present disclosure. Although FIG. 5 shows a single device, it is apparent to one of ordinary skill in the art that each driver thread can operate concurrently on multiple devices.

FIG. 5 shows the relationship between the states of three instances of driver threads 551, 552, and 553. The first driver thread 551 refers to a driver thread that wakes first and executes on the CPU core 501. The second driver thread 552 refers to the thread that wakes from the first driver thread 551. The second driver thread 552 takes over operations from the first driver thread 551 and executes on the CPU core 502. Similarly, the third driver thread 553 refers to the thread that takes over operations from the second driver thread 552 and executes on the CPU core 503. It is apparent to one of ordinary skill in the art that multiple threads can execute on the same CPU core without deviating from the present disclosure.

The second thread 552 begins execution in a wake state 521. Following any house-keeping work, the second thread 552 immediately transitions to the scouting state 522. During the scouting state 522, the second driver thread 552 searches for an unscouted device that requires a driver support. The device may require a driver support because there is an operation that has completed or because the device is ready for a new operation and there is a task to execute. For a read operation, the driver copies data from the device and provides the copied data to an application. For a write operation, the application needs to know when the operation is complete so that it can resume the operation. The second driver thread 552 finds an unscouted device that has a task to execute and claims the ownership of the unscouted device by changing the state of the unscouted device to a scouted state. The second driver thread 552 then changes its own status to the activating state 523. In the case where the first driver thread 551 still holds the device in an active state, the first driver thread observes that the scouted state of the device transitions during or at the end of its current operation. After the first driver thread 551 completes its current operation, the first driver thread 551 updates the scouted device to an inactive state. When the second driver thread 552 observes that the device changes its state to an inactive state by the first driver thread 551, the second driver thread 552 enters the processing state 524 and changes the device state to an active state (using a standard semaphore/mutex technique or an atomic exchange). During the processing state 524, the second driver thread 552 executes operations on the device for the time quanta configured for the scouted driver thread 552. When the time quanta has expired, the second driver thread 552 changes to a post-processing state 525, marks the device state as unscouted, and waits until the device becomes scouted by the third driver thread 553.

The second driver thread 552 may continue to run an operation of the device by starting a new task on the device until the device state is scouted by the third driver thread 553. This avoids wasting cycles on the CPU core while waiting for another thread to be restarted by the operating system. When the device is scouted by the third driver thread 553, the second driver thread 552 marks the device as inactive allowing the transfer of a device control to the third driver thread 553. Once the device is in the inactive state, the second driver thread 552 may perform any post processing required in by the driver that does not involve a control or communication with the device. An example of a task that can be executed in a post-processing state is completing a callback function in a software stack to indicate the I/O operation is complete. After performing any remaining tasks in the post-processing state 525, the second driver thread 552 goes to sleep in a sleep state 526.

Selection of the execution quanta allows the system performance to be tuned. Larger quanta provide an efficient operation on a per thread basis, but cause a single CPU to be held longer by the driver. According to one embodiment, the operation of a computer system is optimized by sharing a variable among driver threads. For example, a "MaximumThreadExecutionCount" variable is used, which allows tuning of the number of threads that can be executing at any one time. When a driver thread is woken up, the driver thread claims an ownership of the variable and checks for it being greater than zero (which means the number of currently executing threads has not reached the maximum and the thread can start). If the variable is greater than 0, the driver thread decrements the variable and continues execution on the device. When a task is completed, the driver thread releases a standard semaphore/mutex or an atomic exchange to the device. If the variable is equal to 0, the executing thread limit has been reached, and the driver thread enters into a sleep state. When the executing thread moves to an active state, the driver thread atomically increments the variable.

According to one embodiment, a semaphore/mutual exclusion technique or an atomic exchange is used to ensure a single ownership of a device state. Only one thread is allowed to update either a scouted/unscouted state or an active/inactive state of a device.

According to one embodiment, the operation of a computer system is optimized by dynamically controlling how many devices each thread can control. In a lightly loaded system (i.e., devices are not busy), a driver thread is allowed to control a larger number of devices leading to improved efficiencies. As the load increases, having the number of threads increase leads to a greater throughput with lower latencies. By dynamically controlling the MaximumThreadExecutionCount variable, the computer system can modify its behavior based on actual traffic and a policy preferred by a system administrator.

The above example embodiments have been described hereinabove to illustrate various embodiments of implementing a system and method of booting a computer system from a non-volatile memory. Various modifications and departures from the disclosed example embodiments will occur to those having ordinary skill in the art. The subject matter that is intended to be within the scope of the present disclosure is set forth in the following claims.

What is claimed is:

1. A method of implementing a multi-threaded polling device driver that includes a plurality of driver threads for controlling a device of a computer system, the method comprising:

checking, by a first driver thread of the plurality of driver threads, a first device state of the device, the first device state having one of an unscouted state or a scouted state, wherein the first driver thread is executed on a first processor core of a multi-core processor of the computer system;

determining, by the first driver thread, that the first device state of the device is in the unscouted state;

changing, by the first driver thread, the first device state of the device to the scouted state;

checking, by the first driver thread, a second device state of the device, the second device state having one of an inactive state or an active state;

determining, by the first driver thread, that the second device state of the device is in the inactive state;

changing, by the first driver thread, the second device state of the device to the active state, wherein the first driver thread has an exclusive ownership of the device during the scouted and active states;

executing, by the first driver thread, a first operation on the device during a pre-determined time slot configured for the first driver thread of the plurality of driver threads;

changing, by the first driver thread, the first device state of the device to the unscouted state after the pre-determined time slot expires while maintaining the second device state of the device in the active state and continuing to execute the first operation on the device, wherein the active state indicates that the device is still controlled by the first driver thread which is executing the first operation on the device;

checking, by a second driver thread of the plurality of driver threads, the first device state of the device, wherein the second driver thread is executed on a second processor core of the multi-core processor of the computer system;

determining, by the second driver thread, that the first device state of the device is back in the unscouted state;

changing, by the second driver thread, the first device state of the device back to the scouted state, wherein the scouted state indicates that the second driver thread has claimed ownership of the device while (a) the second device state of the device remains in the active state and (b) the second driver thread is waiting for the first driver thread to complete execution of the first operation and change the second device state of the device back to the inactive state;

determining, by the first driver thread, that the first device state of the devices is back in the scouted state;

completing, by the first driver thread, the first operation and changing the second device state of the device back to the inactive state;

after observing that the first driver thread has completed the first operation and changed the second device state of the device back to the inactive state to relinquish the exclusive ownership of the device, changing, by the second driver thread, the second device state of the device back to the active state to claim the exclusive ownership of the device; and executing, by the second driver thread, a second operation on the device.

2. The method of claim 1, further comprising:
performing a post-processing task and changing a state of the first driver thread to a sleep state.

3. The method of claim 1, wherein the pre-determined time slot is determined based on a system performance requirement or central processing unit (CPU) utilization.

4. The method of claim 1, further comprising:
dynamically controlling a number of maximum thread execution counts for each driver thread of the plurality of driver threads.

5. The method of claim 4, wherein the number of maximum thread execution counts is dynamically modified based on data traffic or a policy determined by a system administrator.

6. The method of claim 1, further comprising:
implementing a semaphore or a mutual exclusion, or an atomic exchange to ensure a single ownership of the device at a given time.

7. The method of claim 1, wherein the computer system is a multi-socket computer system, and wherein each socket of the multi-socket computer system comprises a multi-core processor.

8. The method of claim 1, wherein the device is a co-processor input/output (CPIO) device.

9. The method of claim 8, wherein the CPIO device comprises a non-volatile dual in-line memory module (NVDIMM).

10. A computer system comprising:
a multi-core processor;
a device; and
a polling device driver partitioned into a plurality of driver threads executed by the multi-core processor to control the device,
wherein the device has a first device state having one of an unscouted state or a scouted state, wherein the device has a second device state having one of an inactive state or an active state, and wherein a first driver thread of the plurality of driver threads is executed by a first processor core of the multi-core processor to:
determine that the first device state of the device is in the unscouted state;
change the first device state of the device to the scouted state;
determine that the second device state of the device is in the inactive state;
change the second device state of the device to the active state, wherein the first driver thread has an exclusive ownership of the device during the scouted and active states;
execute a first operation on the device during a pre-determined time slot configured for the first driver thread of the plurality of driver threads;
change the first device state of the device to the unscouted state after the pre-determined time slot expires, maintain the second device state of the device in the active state, and continue to execute the first operation on the device, wherein the active state indicates that the device is still controlled by the first driver thread which is executing the first operation on the device;
determine that the first device state of the device is back in the scouted state; and
complete the first operation and change the second device state of the device back to the inactive state; and
wherein a second driver thread of the plurality of driver threads is executed by a second processor core of the multi-core processor to:
determine that the first device state of the device is back in the unscouted state;
change the first device state of the device back to the scouted state, wherein the scouted state indicates that the second driver thread has claimed ownership of the device while the second device state of the device remains in the active state and while the second driver thread is waiting for the first driver thread to complete execution of the first operation and change the second device state of the device back to the inactive state;

after observing that the first driver thread has completed the first operation and changed the second device state of the device back to the inactive state to relinquish the exclusive ownership of the device, change the second device state of the device back to the active state to claim the exclusive ownership of the device; and execute a second operation on the device.

11. The computer system of claim 10, wherein a number of maximum thread execution counts for each driver thread of the plurality of driver threads is dynamically controlled.

12. The computer system of claim 11, wherein the number of maximum thread execution counts is dynamically modified based on data traffic or a policy determined by a system administrator.

13. The computer system of claim 10, wherein the computer system is a multi-socket computer system, and wherein each socket of the multi-socket computer system comprises a multi-core processor.

14. The system of claim 10, wherein the device is a co-processor input/output (CPIO) device comprising a non-volatile dual in-line memory module (NVDIMM).

* * * * *